W. Bertram.
Welding Iron.
Nº 15,159. Patented Jun. 17, 1856.
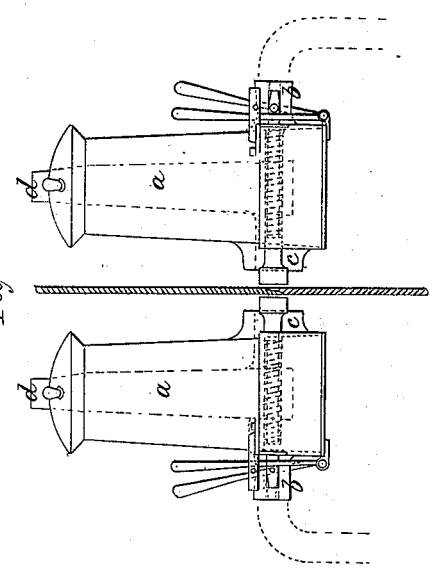
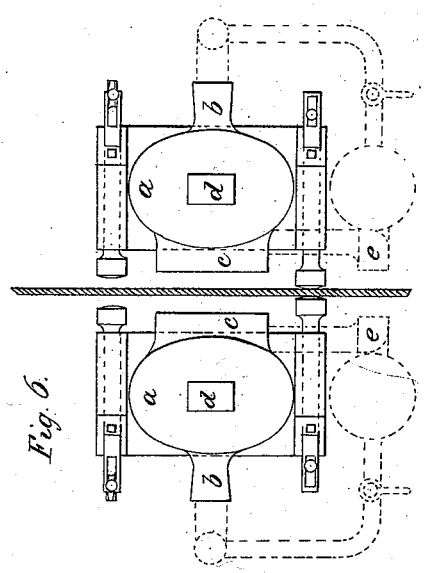
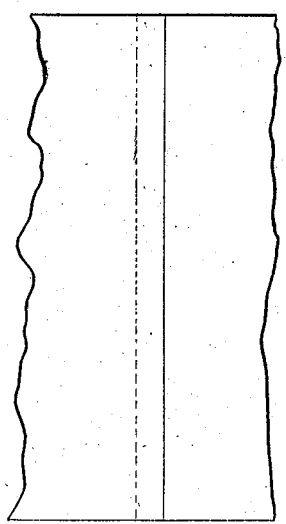
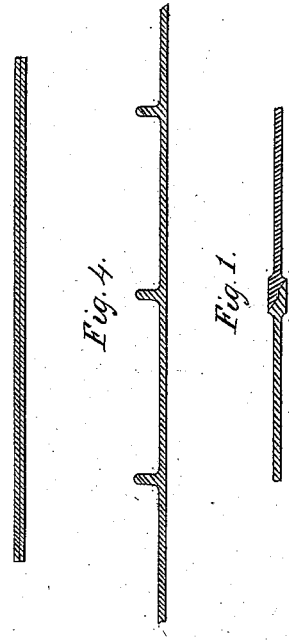
Inventor;
W. Bertram

UNITED STATES PATENT OFFICE.

WILLIAM BERTRAM, OF WOOLWICH, ENGLAND, ASSIGNOR TO JOHN W. COCHRAN, OF NEW YORK, N. Y.

WELDING IRON PLATES.

Specification of Letters Patent No. 15,159, dated June 17, 1856.

*To all whom it may concern:*

Be it known that I, WILLIAM BERTRAM, of Woolwich, England, have made certain improvements in the manufacture and construction of ships' steam and other boilers, bridges, and other structures where numerous sheets or plates of iron are used, of which the following is a description.

Heretofore in the manufacture or construction of iron ships, steam and other boilers, bridges and other structures where numerous sheets or plates of iron are used it has been usual to fix the edges of such sheets or plates of iron together by rivets, and also when ribs or angle irons have been used to give strength to the structures the sheets have also been fixed thereto by rivets, by which modes of construction all the parts so joined are greatly weakened by the quantities of metal cut away to receive the rivets, and the weight of iron used to obtain a given strength has been necessarily increased by reason of such cutting away, the overlapping of the edges, and the greater thickness of metal at those parts.

Now the object of my invention, is, to cause the sheets of iron to be formed suitable at the edges that they may be welded together and where ribs or angle iron have heretofore been used and are required to give strength to the structures the sheets of iron are forged or rolled with ribs thereon in a suitable manner to admit of the edges and the ribs of one sheet being welded to that of another and such ribs are either made transversely or in the direction of the lengths of the sheets—but in those cases where it would be more convenient to use independent ribs as heretofore used I weld the plates to the ribs in the same manner as the edges of the sheets one to another.

In ship building the keel and keelson and also the cutwater and sternpost are all welded into one piece of iron and the sheets and ribs welded thereto; and in order to bring up the parts about to be welded one to the other to a welding heat as they must be heated and welded in their positions two portable forges or furnaces are used, one on either side of two sheets or parts which are to be welded together. The furnaces, each consists of a vessel to contain fuel, having an opening on one side to receive the end of the blowing pipe, and at the opposite side, an opening so that when the blast of air is sustained, and the opening has the sheet or part resting against or contiguous to it, the flame and heat will be projected against the surface of the iron, and as the other furnace is held and similarly used on the opposite side of the iron, the two pieces of iron in contact and which are to be welded together, will become heated to a welding heat, when the hammermen striking together on opposite sides, or one pressing and the other striking, weld the two heated plates or parts together, or in place of hammermen where it can be applied, I propose to employ two steam hammers suitably arranged and supported to act opposite each other, or one steam hammer and an anvil to resist its action while welding the parts together.

For the purpose of facilitating the use of the portable furnaces and portable steam hammers, they are mounted in suitable frames which move on rails, in some cases above the work and in other cases on the ground, and the frames, rails and apparatus used with the portable forges and hammers, are to be such as to admit of their following the varying form of the structure for the time being under the process of being welded together.

The form which I prefer to give the edges of the sheets of iron before being welded together will be better understood by reference to the drawing where—

Figure 1, represents the section of a lap or junction of the two sheets of iron welded together according to my invention at the same time I would remark that it is not essential to thicken or give any particular form to the edges of the sheets of iron as they may be welded together by overlapping their edges or otherwise as shown at Figs 2 and 3, and where ribs or angle irons have heretofore been used and are required to give strength to the structure the sheets of iron are to be made, rolled or forged with ribs thereon in a suitable manner to admit of the ribs and edges of one sheet being welded to those of another sheet, such ribs being made in such direction on the sheet as the particular application may require as seen in Fig. 4.

The construction of forge or blast furnaces I have found convenient for effecting the union by welding of sheets or parts in forming structures according to my invention is shown in Figs. 5 and 6 where a plan of two such forges or blast furnaces is shown with two parts of iron which are about to be welded together in a position opposite to and between the mouths of the forges to receive a welding heat. Each of these furnaces consists of a closed vessel or chamber *a, a*, (to contain coke or other suitable fuel) lined with suitable fire brick or material to stand the requisite heat. Each vessel has a pipe or opening *b, b*, to receive the end of a pipe through which a blast of heated or cold air is forced by any suitable blowing apparatus into the vessel *a, a*, and through the ignited fuel, by which a flame will be forced through each outlet *c, c* against the parts to be heated and welded.

Each vessel or chamber *a, a*, is furnished with a feeding aperture *d, d* plugged and luted with fire material when in action, and also with means for removing the clinkers, &c., below the blast pipe and outlet. The form and dimensions of the mouth or outlet *c, c* of each vessel or chamber *a, a* is to be varied according to the shape and extent of the surfaces to be heated and welded.

The parts of iron which are to be welded together having been brought to a welded heat the furnaces are to be progressively moved to other parts so that they may be undergoing the process of heating while the welding of the previously heated parts together may be accomplished by hammering by hand hammers, as before mentioned or by hammers mounted on the furnace frames. The hammers are kept in contact with the plate by springs as shown by blue lines on Fig. 5, and struck by hand hammers as shown in Figs. 5 and 6, but I prefer when desirable to employ steam hammers opposite to each other or one steam hammer and an anvil. In some cases in places of employing hammers I cause the parts at a welding heat to be pressed together by rollers or levers, acting simultaneously on both sides of the parts to be welded. It is also convenient to use an auxiliary or second aperture or branch shown by dotted lines *e, e* but I prefer a separate furnace or furnaces for this purpose with on independent mouth piece which may be attached to the principal or welding furnaces in any convenient manner and move simultaneously with them. The blast may be supplied to these additional furnaces by branches from the main blast pipe fitted with a regulating valve or cock to adjust it, by which the parts welded can be kept hot during the time that the contiguous part is being welded by which undue contraction is prevented; this may be also done by retrograding the furnaces or by any equally convenient means but a loss of time would thereby ensue, and the work be less perfectly done.

Having now described the manner of carrying out my invention, in the construction of ships' bridges, boilers and other structures where numerous sheets, bars or plates of iron are used, what I claim as new and desire to secure by Letters Patent is—

Welding the separate faces of such bars or plates together by pressure or concussion while at the same time they are subjected to opposite blasts of heat in the manner herein set forth.

WM. BERTRAM.

Witnesses:
R. A. BROOMAN,
M. HENRY.